US008630262B2

(12) United States Patent
Chindapol et al.

(10) Patent No.: US 8,630,262 B2
(45) Date of Patent: Jan. 14, 2014

(54) SIGNALING EXCHANGE FOR HANDOVER CONTROL FOR WIRELESS NETWORKS

(75) Inventors: Aik Chindapol, Washington, DC (US); Giovanni Maggi, Milan (IT); Daniele Tortora, Sesto s. Giovanni (IT)

(73) Assignee: Nokia Siemens Networks Oy, Espoo (FI)

( * ) Notice: Subject to any disclaimer, the term of this patent is extended or adjusted under 35 U.S.C. 154(b) by 248 days.

(21) Appl. No.: 13/059,380

(22) PCT Filed: Sep. 11, 2009

(86) PCT No.: PCT/EP2009/061807
§ 371 (c)(1),
(2), (4) Date: May 9, 2011

(87) PCT Pub. No.: WO2010/029148
PCT Pub. Date: Mar. 18, 2010

(65) Prior Publication Data
US 2011/0206006 A1 Aug. 25, 2011

Related U.S. Application Data

(60) Provisional application No. 61/096,306, filed on Sep. 11, 2008.

(51) Int. Cl.
*H04W 4/00* (2009.01)
*H04W 36/00* (2009.01)
(52) U.S. Cl.
USPC .......................................... 370/331; 455/436
(58) Field of Classification Search
None
See application file for complete search history.

(56) References Cited

U.S. PATENT DOCUMENTS

| 2006/0099948 | A1 | 5/2006 | Hoghooghi et al. | |
|---|---|---|---|---|
| 2006/0229075 | A1 | 10/2006 | Kim et al. | |
| 2007/0070929 | A1* | 3/2007 | Kang et al. | 370/310 |
| 2007/0232305 | A1* | 10/2007 | Jung et al. | 455/435.1 |
| 2009/0323634 | A1* | 12/2009 | Kim et al. | 370/331 |
| 2010/0067698 | A1* | 3/2010 | Hahn et al. | 380/270 |
| 2011/0176514 | A1* | 7/2011 | Yoon et al. | 370/331 |

FOREIGN PATENT DOCUMENTS

| EP | 1684538 A1 | 7/2006 |
|---|---|---|
| EP | 2059080 A1 | 5/2009 |
| WO | 2009/122304 A2 | 10/2009 |

OTHER PUBLICATIONS

Maggi et al., "Capability Exchange for BS-control Handover", IEEE 802.16 Broadband Wireless Access Working Group, IEEE C802.16maint-08/303, Sep. 11, 2008, pp. 1-3.*

(Continued)

*Primary Examiner* — Clemence Han
(74) *Attorney, Agent, or Firm* — Brake Hughes Bellermann LLP

(57) ABSTRACT

Various example embodiments are disclosed herein. According to an example embodiment, a technique may include transmitting, from a mobile station to a base station in a wireless network, a message (e.g., a subscriber station basic capability (SBC) request message) indicating whether or not the mobile station supports base station-controlled handover for the mobile station. The technique may also include receiving, by the mobile station from the base station, a message (e.g., a subscriber station basic capability (SBC) response message) indicating whether or not the base station supports base-station controlled handover.

22 Claims, 9 Drawing Sheets

(56) References Cited

OTHER PUBLICATIONS

IEEE, "IEEE Standard for Information Technology—Telecommunications and information exchange between systems—Local and metropolitan area networks—Specific requirements", Part 11: Wireless LAN Medium Access Control (MAC) and Physical Layer (PHY) Specifications; IEEE Computer Society, IEEE Std. 802.11-2007, Jun. 12, 2007, 1231 pages.

IEEE, "Part 16: Air Interface for Broadband Wireless Access Systems", IEEE WirelessMan 802.16, DRAFT Standard for Local and metropolitan area networks, LAN/MAN Standards Committee of the IEEE Computer Society, and the IEEE Microwave Theory and Techniques Society, P802.16Rev2/D6, Jul. 2008, 2068 pages.

Maggi, et al., "Capability Exchange for BS-control Handover", IEEE 802.16 Broadband Wireless Access Working Group, IEEE C802.16maint-08/303, Sep. 11, 2008, pp. 1-3.

Maggi, et al., "Capability Exchange for BS-control Handover", IEEE 802.16 Broadband Wireless Access Working Group, IEEE C802.16maint-08/303r1, Sep. 17, 2008, pp. 1-3.

International Search Report for International Application No. PCT/EP2009/061807, mailed Jan. 4, 2010, 3 pages.

Shim, et al, "Support of load balancing to enhance service availability", IEEE 802.16 Broadband Wireless Access Working Group, IEEE C802.16maint-08/013r10, Apr. 30, 2008, pp. 1-8.

\* cited by examiner

SIGNALING EXCHANGE FOR HANDOVER CONTROL FOR WIRELESS NETWORKS

CROSS-REFERENCE TO RELATED APPLICATIONS

This application is a national stage entry of PCT Application No. PCT/EP2009/061807, filed on Sep. 11, 2009, entitled "SIGNALING EXCHANGE FOR HANDOVER CONTROL FOR WIRELESS NETWORKS", which, in turn, claims the benefit of priority based on U.S. Provisional Application No. 61/096,306 filed on Sep. 11, 2008, the disclosures of which are hereby incorporated by reference in their entirety.

TECHNICAL FIELD

This description relates to wireless networks.

BACKGROUND

Some wireless networks may support both mobile station (MS) initiated handover and base station (BS) initiated handover. Different handover algorithms and/or criteria may be used by a MS and a BS, for example, for handover. In some cases, for example, a MS may initiate handover based on received channel quality or RSSI (received signal strength indication), e.g., performing handover to a BS having highest channel quality as received by the MS. Whereas, the BS typically has a wider scope, the BS may instruct the MS to handover to a BS to perform load balancing or reduce load on the BS, for example. In some cases, a ping-pong effect can occur where a BS may instruct the MS to handover to a target BS that is not the best serving BS (from the MS's perspective), only to have the MS perform a handover back to the best serving BS.

SUMMARY

According to an example embodiment, a method may include transmitting, from a mobile station to a base station in a wireless network, a message indicating whether or not the mobile station supports base station-controlled handover for the mobile station.

According to another example embodiment, an apparatus may include a processor (or controller); and a wireless transceiver. The apparatus (or the wireless transceiver under control of the processor/controller) may be configured to transmit, from a mobile station to a base station in a wireless network, a message indicating whether or not the mobile station supports base station-controlled handover for the mobile station.

According to another example embodiment, a method may include receiving, by a base station from a mobile station in a wireless network, a message indicating whether or not the mobile station supports base station-controlled handover for the mobile station.

According to another example embodiment, an apparatus may include a processor or controller; and a wireless transceiver. The apparatus (or the wireless transceiver under control of the processor/controller) may be configured to receive, by a base station from a mobile station in a wireless network, a message indicating whether or not the mobile station supports base station-controlled handover for the mobile station.

The details of one or more implementations are set forth in the accompanying drawings and the description below. Other features will be apparent from the description and drawings, and from the claims.

DETAILED DESCRIPTION

Figure 1:
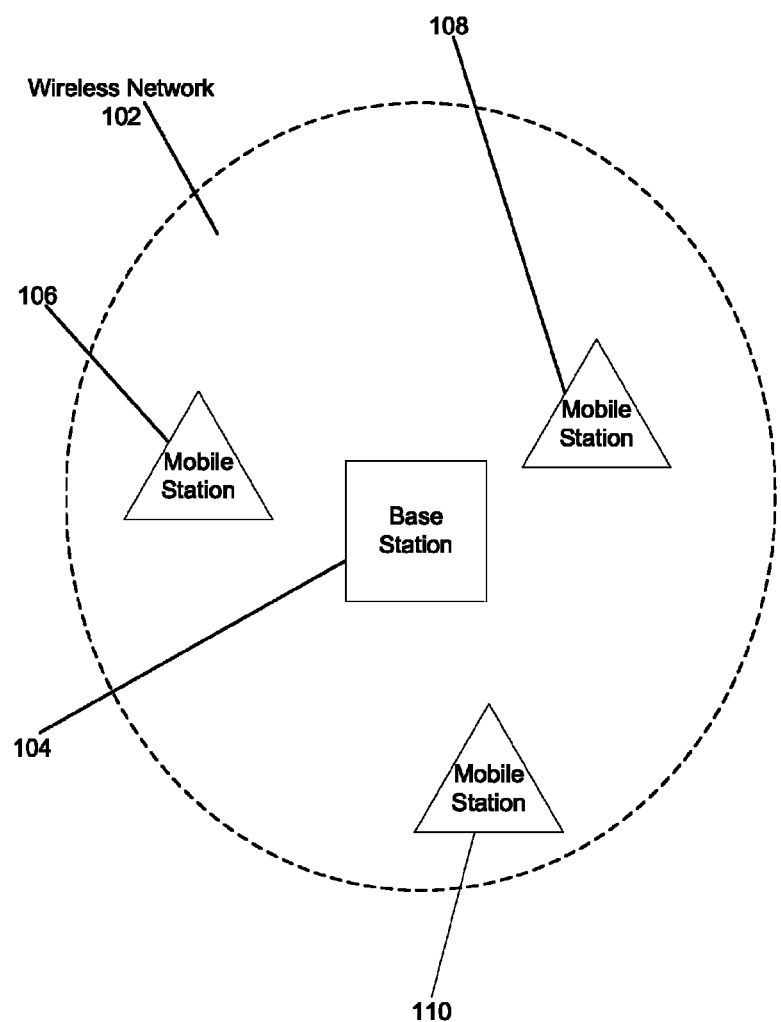
FIG. 1 is a block diagram of a wireless network according to an example embodiment.

FIG. 1 is a block diagram of a wireless network 102 including a base station 104 and three mobile stations 106, 108, 110 according to an example embodiment. Although not shown, mobile stations 106, 108 and 110 may be coupled to base station 104 via relay stations or relay nodes, for example. The wireless network 102 may include, for example, an IEEE 802.16 Wireless Metropolitan Area Network (WiMAX), an IEEE 802.11 Wireless Local Area Network (WLAN), or a cellular telephone network, according to example embodiments. The base station 104 may include a cellular or WiMAX base station (BS), a node B, an 802.11 access point, or other infrastructure node, according to various example embodiments. The term "base station" (BS) may be used herein and may include any type of infrastructure node. The mobile stations 106, 108, 110 may include laptop or notebook computers, smartphones, personal digital assistants (PDAs), cellular telephones, WiMAX device, subscriber station, or any other wireless device, according to example embodiments. The term "wireless node" may include any type of wireless node, such as base stations, mobile stations, etc. While the present disclosure may use some of the terminology of WiMAX or other wireless standards, aspects of the present disclosure may be applicable to any networking or wireless technologies.

Figure 2:
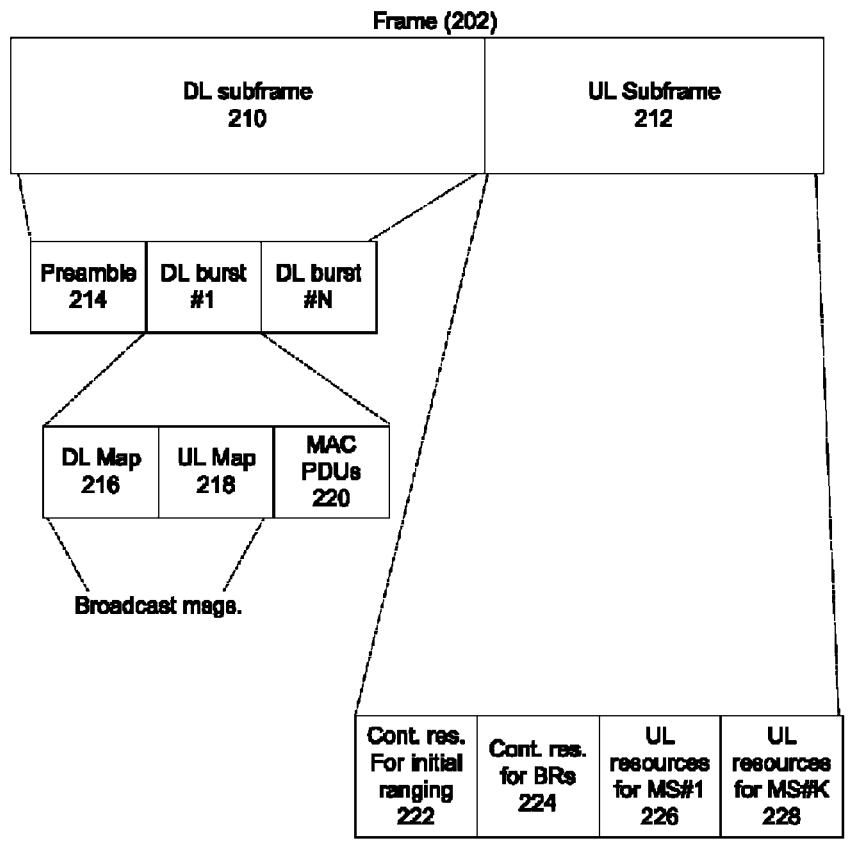
FIG. 2 is a diagram illustrating an example embodiment of a frame that may be used according to an example embodiment.

FIG. 2 is a diagram illustrating a frame according to an example embodiment. The example frame 202 may include a downlink (DL) subframe 210 and an uplink (UL) subframe). The DL direction may include signals transmitted from the BS 104 to mobile stations (or mobile nodes) 106, 108 and 110. While the UL direction may include signals transmitted from mobile stations 106, 108 or 110 to BS 104.

The DL subframe 210 illustrated in FIG. 2 is an example DL subframe, and may include a number of fields, some of which are shown in FIG. 2. The DL subframe 210 may include a preamble 214, and one or more DL data bursts, such as DL burst #1, DL burst #2, . . . DL burst #N. DL burst #1 may include a Map message that may include some scheduling information for one or more data bursts. DL burst #1 may include a DL Map 216 that provides DL burst scheduling information, and an UL Map 218 that may provide UL scheduling information (or identify the scheduled UL resources for the current subframe or for a subsequent subframe). The DL Map 216 and the UL Map 218 are part of the broadcast information or broadcast messages transmitted by BS 104, for example. A Map message, transmitted by a BS 104 (FIG. 1) to one or more mobile stations, may include the DL Map 216, the UL Map 218, and/or other information, to provide scheduling and resource information for DL and UL transmissions. The DL Map 216 and the UL Map 218 may be transmitted via one or more information elements (IEs) within a Map message, for example. For example, each Map IE may allocate resources to a MS or connection ID (CID), e.g., by specifying the allocated resources and the CID or MS for which the resources are allocated. Additional MAC PDUs 220 (protocol data units) may also be provided in the DL subframe 210.

UL subframe 212 illustrates some fields of an example UL subframe, and may include, for example, UL contention resources for initial ranging 222, UL contention resources for bandwidth requests 224 (e.g., to allow MSs to make requests for bandwidth or UL resources), and then UL resources allocated to one or more mobile stations, e.g., UL resources for MS#1 226, . . . UL resources for MS#K 228. Other fields may be provided in DL subframe 210 and/or UL subframe 212. Frame 202 is merely an example frame format, and a wide variety of frame formats may be used.

A handover of MS 106 may be performed from a serving BS 104 to one of several possible or candidate BSs, e.g., candidate BSs 108, 110, . . . . A very brief overview of the handover procedure will be described, according to an example embodiment. Not all the details are included, but only a very brief summary of some details. The handover procedure may be considered as divided into three steps (or phases), as an example: 1) handover preparation, e.g., which may include signal measurements, scanning, ranging; 2) handover decision (e.g., deciding or determining to perform a handover, and/or selecting a candidate BS for handover), which may be performed based on metrics, measurements, scanning, algorithms, etc., at the BS and/or MS. In an example embodiment, the decision phase may be considered part of the preparation phase. and 3) handover execution (e.g., which may include the signaling phase of sending/originating or receiving messages from MS or from BS (depending on who has the control of the process). Some aspects of these 3 phases will be briefly described, according to an example embodiment.

The handover preparation may be initiated by either the MS or the BS. During handover preparation, for example, neighbor (or candidate) BSs may typically be compared by one or more metrics, such as received signal strength, Quality of Service (QoS) parameters, and one of the candidate BSs is selected. The MS may, in some cases, perform ranging with the selected candidate BS to expedite the future handover. The MS may request handover by sending to the serving BS a mobile station handover (MSHO) request message, to which the serving base station may reply with a base station handover (BSHO) response message that may identify one or more candidate BSs. Alternatively, the MS may scan for signals transmitted by neighbor BSs, and may generate and send to the serving BS a mobile scanning (or measurement) report 112 of neighboring BSs (e.g., reporting one or more metrics or values for each of the neighboring BSs). The serving BS 104 may trigger handover with a BSHO request message, e.g., which may include a list of suggested candidate BSs that MS can handover to.

After handover preparation, handover execution may start. For example, when the MS is about to move to the new link (to the new BS) after selecting one of the candidate BSs, the MS may send a handover indication message to the serving BS. After making a new attachment with the new or selected candidate BS, the MS may perform ranging with the selected candidate (or target) BS to acquire physical parameters from the selected candidate BS, tuning its physical parameters to the target BS, which may include the MS sending a Ranging Request (RNG-REQ) message, and receiving from the BS a Ranging Response (RNG-RSP) message. The MS and new BS may then negotiate basic capabilities such as maximum transmit power and modulator/demodulator type, and other capabilities. Capabilities may be communicated or exchanged, for example, via the use of capabilities messages, such as a subscriber station basic capabilities request message (SBC-REQ) from the MS (e.g., identifying one or more capabilities of the MS), and/or a subscriber station basic capabilities response message (SBC-RSP) from the BS (e.g., identifying one or more capabilities of the BS). The MS may then register with the new or target BS, and the new or target BS may begin serving the MS.

Thus, as noted, some networks may support both MS initiated handover and BS initiated handover. Different handover algorithms and/or criteria may be used by a MS and a BS, for example, for handover. In some cases, for example, a MS may initiate handover based on received channel quality or RSSI (received signal strength), e.g., performing handover to a BS having highest channel quality as received by the MS. Certain trigger conditions may be broadcast by the BS to help MS search for a proper BS during the handover preparation phase. Whereas, the BS has a wider scope, the BS may instruct the MS to handover to a BS to perform load balancing or even out the load on the BSs, for example. In some cases, a ping-pong effect can occur where a BS may instruct the MS to handover to a target BS that is not the best serving BS (from the MS's perspective), only to have the MS perform a handover back to the best serving BS.

According to an example embodiment, a base station-controlled handover (BS-controlled HO) may be implemented by both a BS and a MS. According to an example embodiment of base station-controlled handover, the BS may initiate handover for a MS. Also, the BS may configure or identify the conditions (which may be referred to as trigger conditions or trigger events) under which a handover can be initiated by the MS. Thus, according to an example embodiment of base-station controlled handover, the BS may initiate handover of a MS, and the MS may initiate handover only according to certain trigger events configured or identified by the BS. Thus, base station-controlled handover (BS-controlled HO), by the BS or network entity allowing MS initiated handover only under certain specified trigger events, the BS may control handover for the MS, thus, preventing or at least decreasing the probability of a conflict between BS and MS for handover, such as the ping-pong scenario described above. In addition, by allowing MS initiated handover only for the specific or configured trigger events, the BS and/or network entity may more effectively allocate resources or balance the load of mobile stations.

As an example trigger event, where the MS and BS have proposed different target BSs for handover for the MS, the MS may initiate handover to its proposed target BS if: 1) the received channel quality (e.g., received signal strength measured at the MS) of the signal from the target BS proposed by the serving BS is less than a first threshold, and 2) the received channel quality of the signal from the target BS proposed by the MS is greater than a second threshold. This is merely an example of a trigger event (or trigger condition) that may be configured by the BS or other network entity, to allow the MS to initiate handover. Of course, many other trigger events may be provided.

Figure 3:
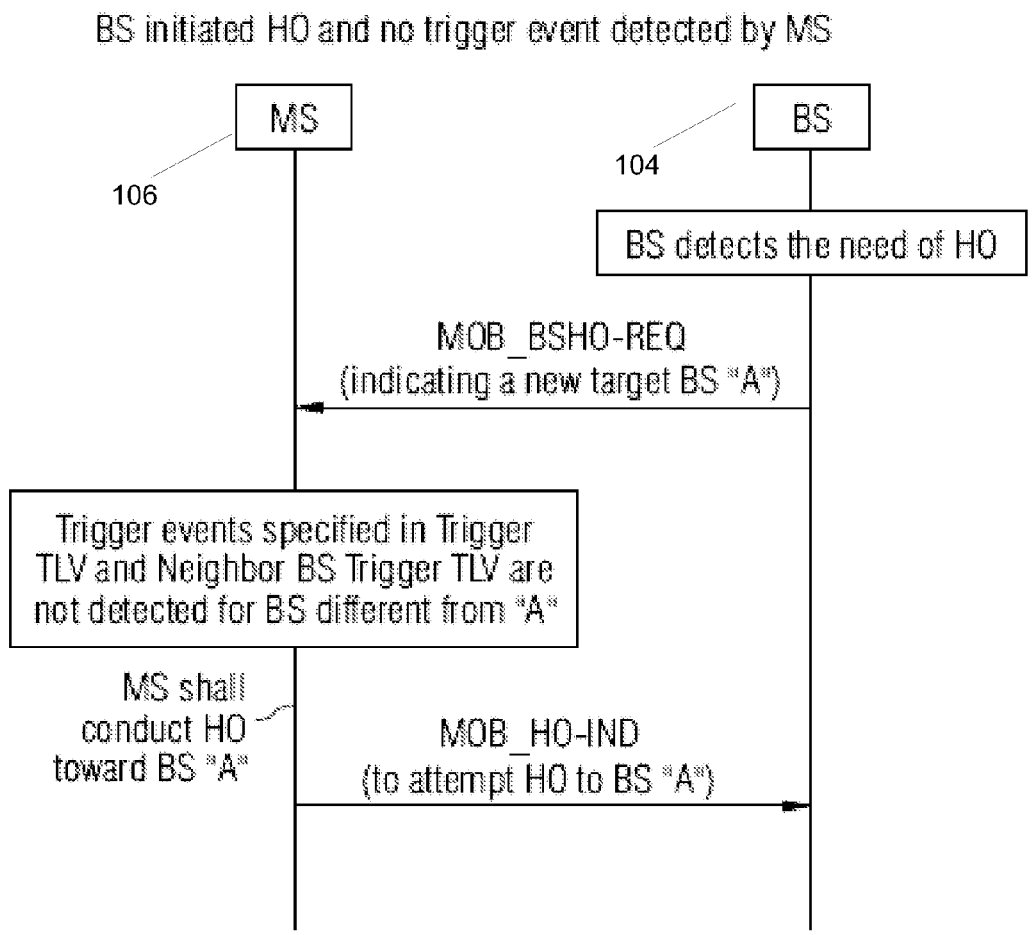
FIG. 3 is a diagram illustrating operation of a base station-controlled handover according to an example embodiment.

FIG. 3 is a diagram illustrating operation of a base station-controlled handover according to an example embodiment. In FIG. 3, the BS 104 may detect that a handover should be performed for the MS 106, e.g., if the BS 104 is busy or overloaded. BS 104 identifies a new target BS A, and sends the MS 106 a base station handover request (MOB_BSHO-REQ) that indicates a new target BS A for handover for MS 106. Presently, there are no trigger events detected by the MS. Thus, the MS sends a handover indication (MOB_HO-IND) to the serving BS 104, indicating that the MS will perform handover to the BS A as instructed by BS 104, and handover is performed from serving BS 104 to target BS A.

Figure 4:
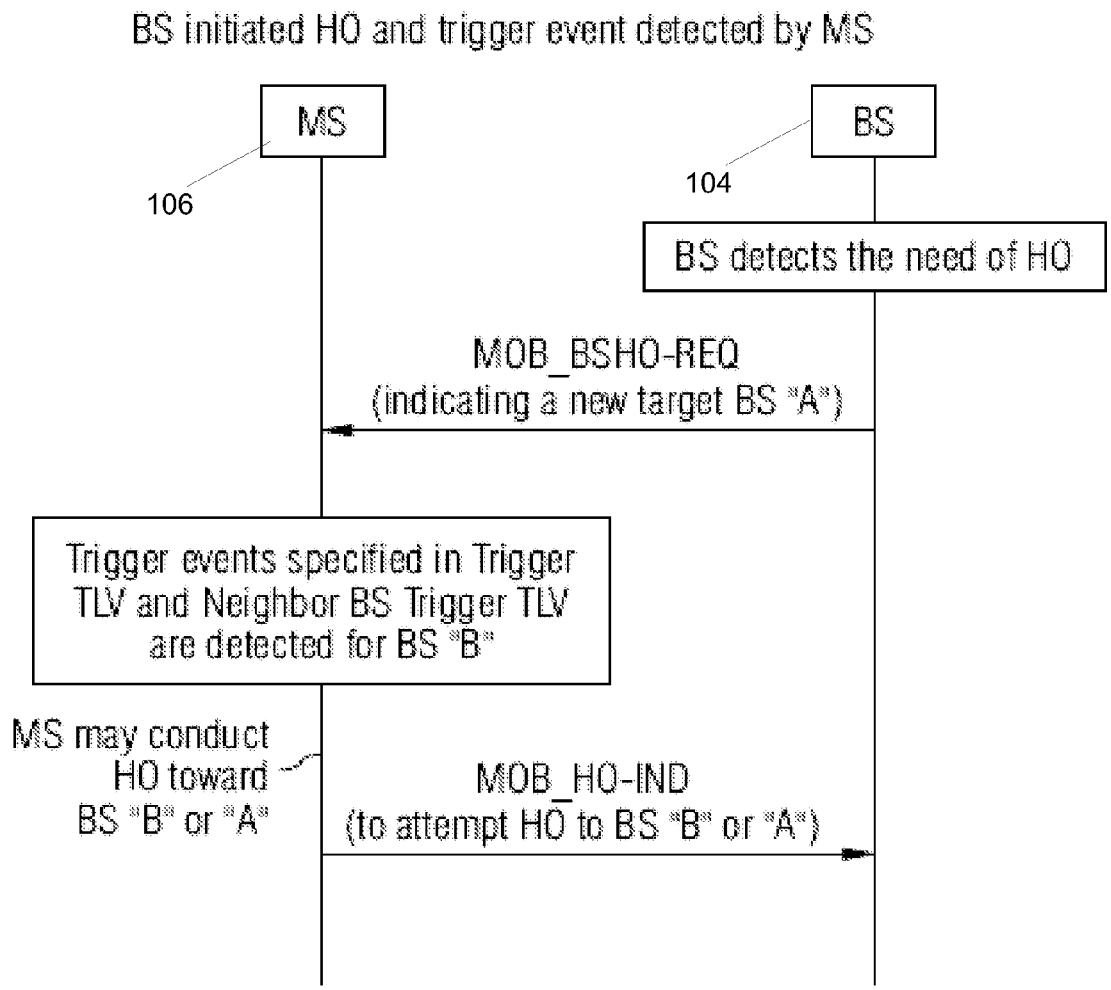
FIG. 4 is a diagram illustrating operation of a base station-controlled handover according to another example embodiment.

FIG. 4 is a diagram illustrating operation of a base station-controlled handover according to another example embodiment. Serving BS 104 may detect a need for handover for MS 106 (e.g., BS 104 being overloaded), and sends a base station handover request indicating a new target BS A. However, at the MS 106, a trigger event is detected by MS 106 for BS B (e.g., received signal strength for BS B is significantly higher than received signal strength for BS A, as measured by the MS 106). This trigger event was previously configured or identified by the BS 104 (or other network entity) to the MS 106. Thus, in such case, MS 106 may initiate handover to BS B (since the trigger event, previously configured by the network or by BS 104, was detected by MS 106), or the MS 106 may perform handover to BS A as instructed by serving BS 104. Thus, MS 106 may send a handover indication identifying, e.g., BS B for handover. Alternatively, MS 106 may indicate handover to BS A.

Figure 5:
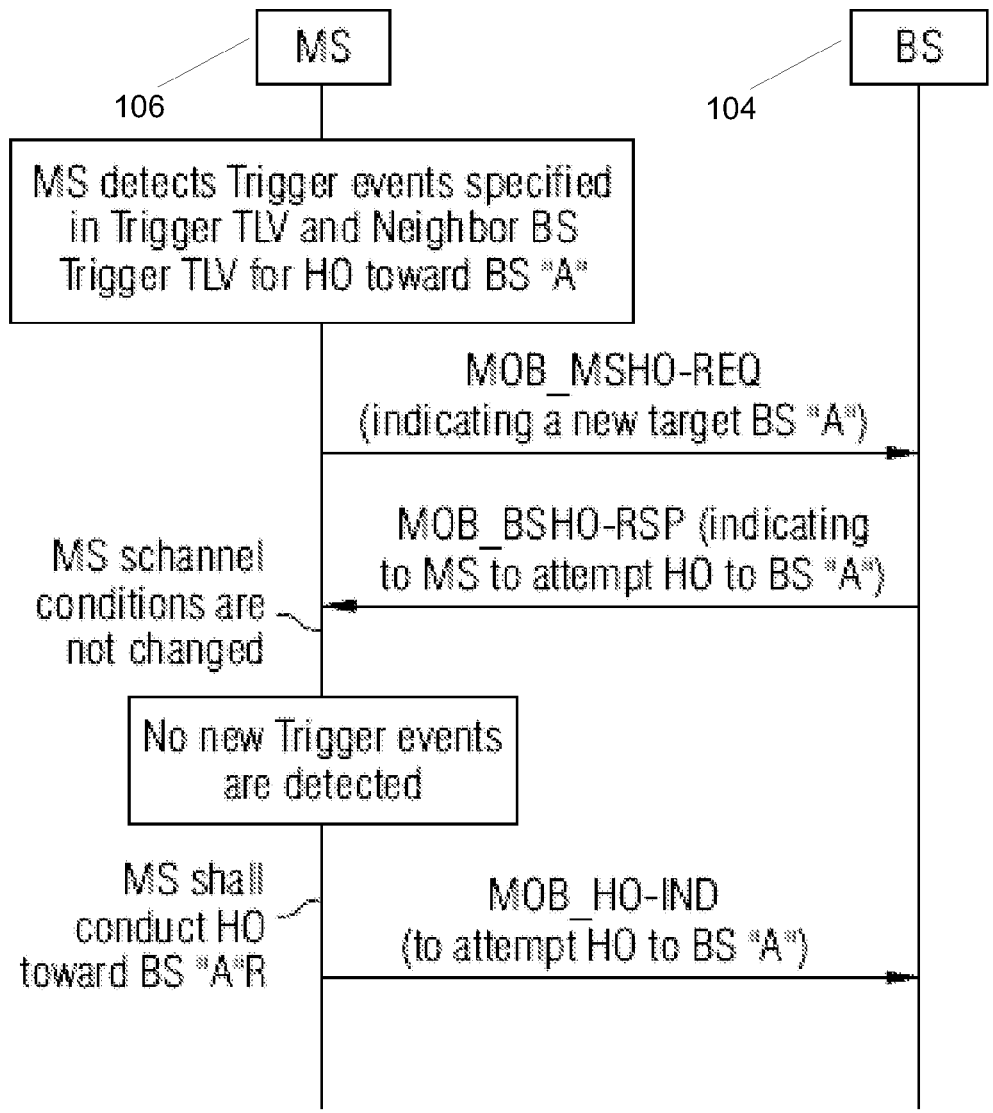
FIG. 5 is a diagram illustrating operation of a base station-controlled handover according to another example embodiment.

FIG. 5 is a diagram illustrating operation of a base station-controlled handover according to another example embodiment. MS 106 may detect a trigger event for handover to BS A (e.g., signal strength for BS A is significantly higher than for serving BS 104, as an example trigger event, as previously configured or identified by the BS or other network entity). MS 106 sends a mobile station handover request (MOB_MSHO-REQ) to serving BS 104 indicating that MS 106 will perform or attempt HO to BS A, and the BS 104 confirm this by sending a base station handover response (MOB_BSHO-RSP) to the MS 106. For example, the channel conditions may not have changed, and no new trigger events are detected by the MS 106. If a new trigger event is detected, then this may (at least in some cases) cause the MS to perform a handover to a different BS (e.g., to BS B or C, not shown). Thus, in this example, the MS send a handover indication to BS 104 indicating that the MS will perform handover to BS A, and performs a handover to BS A.

In some cases, not all MSs will support BS-controlled HO. Thus, a legacy MS may not support BS-controlled HO, or even be aware of this feature. When such a legacy MS enters a network or cell that is using BS-controlled HO, this may create problems in some cases, especially if the BS does not know whether the MS supports BS-controlled HO. Thus, according to an example embodiment, as described below with reference to at least FIG. 6, a signaling or communication mechanism is provided that may allow a MS to communicate to a BS whether the MS supports BS-controlled HO. Likewise, a signaling mechanism is provided that may allow the BS to indicate to an MS of whether or not the BS supports BS-controlled HO. Based on this capability information received from the MS, the BS may make a determination of whether to allow the MS to join or enter the network. And similarly, based on capability information received from the BS, the MS may determine whether to join this network or cell (e.g., that support BS controlled HO), or another network or cell that does not support BS-controlled HO.

Figure 6:
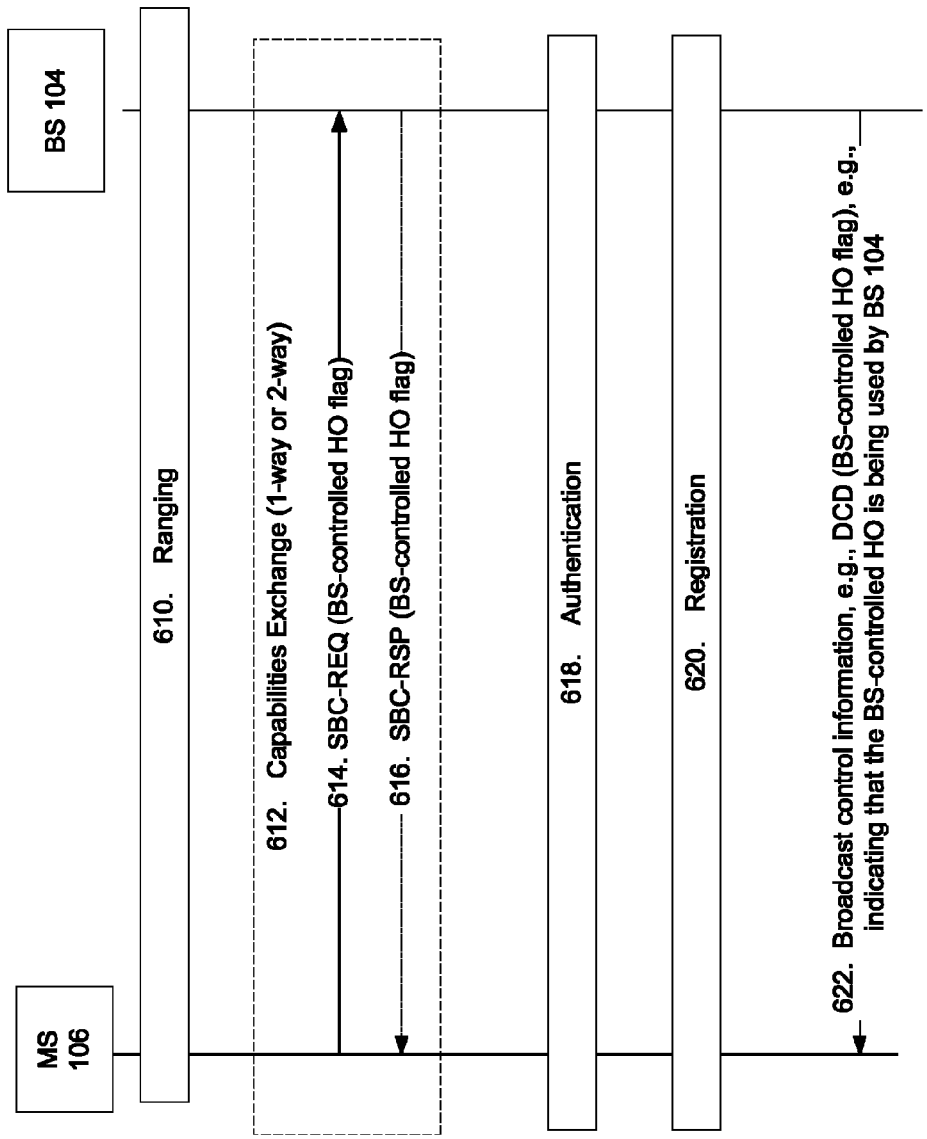
FIG. 6 is a timing diagram illustrating operation of signaling exchange regarding a base station controlled handover capability according to an example embodiment.

FIG. 6 is a timing diagram illustrating operation of signaling exchange regarding a base station controlled handover capability. MS 106 may begin network entry for BS 104 by obtaining necessary uplink and downlink parameters including performing ranging between MS 106 and BS 104 at 610, capabilities exchange 612 between MS 106 and BS 104, authentication 618 between MS 106 and BS 104, and registration 620 between MS 106 and BS 104, as examples. Network entry may include other tasks or functions not shown.

The capabilities exchange 612 may include the MS 106 transmitting or providing a list of its capabilities to the BS 104, e.g., via a capability request message, such as an IEEE 802.16 subscriber station basic capability (SBC) request message (SBC-REQ), 614, or other message. The SBC-REQ message may include a BS-controlled HO flag (e.g., within an extended capability field of SBC-REQ message 614) that indicates whether or not the MS 106 supports base station-controlled handover. For example, setting this BS-controlled HO flag to 1 in the SBC-REQ message 614 may indicate that the MS supports BS-controlled HO, and clearing this bit to zero indicates that this feature is not supported by the MS. The lack of an explicit capability request message containing a BS-controlled HO flag may indicate that this feature is not supported by the MS. Thus, according to an example embodiment, when MS 106 indicates that is supports BS controlled HO, and connects to a BS that uses or implements BS-controlled HO, the MS 106 may then initiate handover only according to the BS-controlled HO procedure that may include detection of the trigger event(s) specified or configured by the BS 104, for example.

Similarly, although not required, the BS 104 may send the MS 106 a list of its capabilities, e.g., via a capability message, such as a subscriber station basic capability response (SBC-RSP) message 616. The SBC-RSP message 616 may include a BS-controlled HO flag (e.g., within an extended capability field of SBC-RSP 616) that indicates whether or not the BS 104 supports base station-controlled handover. For example, setting this BS-controlled HO flag to 1 in the SBC-RSP message 616 may indicate that the BS supports this feature, and clearing this bit to zero indicates that this feature is not supported by the BS. Thus, according to one example embodiment, BS-controlled HO may be implemented between a BS and a MS only if both BS and MS have indicated capability for such feature via capability messages or other messages exchanged between the BS and MS. According to another example embodiment, BS-controlled HO may also be implemented even if some MSs are not capable of supporting such feature.

The capabilities exchange 612 may include both messages 614 and 616 in one embodiment (2-way exchange, where both MS and BS indicate their ability to support BS-controlled HO), or may just include SBC-REQ message 614 (e.g..., 1-way communication indicating MS's capability to support BS-controlled HO). Thus, in one example embodiment, it may be optional, for example, whether the BS sends the message indicating the BS's support for this feature, e.g., via the SBC-RSP 616. Thus, SBC-RSP message 616 may be omitted, in an example embodiment. In this case, according to an example embodiment, the MS may assume that the BS supports BS-controlled HO unless specifically informed otherwise (e.g., via the SBC-RSP message with BS-controlled HO flag set to 0 indicating no support for this feature).

A BS may, in some cases, transmit or broadcast a message(s) indicating which of its capabilities are being used or turned on. Some features may be indicated as in use simply via the capabilities exchange, while other capabilities may use an additional transmission of DCD or other message to indicate that such feature is actually in use by the BS. For example, BS 106 may transmit or broadcast a DCD (downlink channel descriptor) 622 (or other message) that includes a BS-controlled HO field, e.g., set to 1, to indicate that the base station is using (or enforcing or implementing) the base station-controlled handover feature, or in other words, that this feature is turned on or in use by the BS. Since this DCD broadcast may occur at any time, e.g., before and/or after the ranging, capabilities exchange, authentication and registration, and may occur from time to time, the MS may acquire the knowledge that the BS is capable of supporting the BS-controlled handover feature even before the capability exchange messages. However the lack of a BS-controlled handover field in the broadcast message or the value set to 0 does not necessarily mean the BS is not capable of supporting the BS-controlled handover feature. While the DCD 622 may indicate use of the base station-controlled HO, such a broadcast does not inform the BS 104 of whether or not the MS actually supports BS-controlled HO. Thus, the capabilities exchange, including a message (e.g., SBC-REQ 614) sent from the MS may be used to inform the BS of whether or not the MS supports the BS-controlled HO feature.

According to an example embodiment, based on the capabilities information provided by the MS (e.g., via SBC-REQ message 614) indicating whether or not the MS supports the BS-controlled HO feature, the BS 104 may decide or determine whether or not to allow the MS to continue with network entry, e.g., authentication, registration, etc. For example, the BS may decide to reject the MS (or prevent the MS from completing network entry) if the BS is requiring every MS in its cell or network to comply with (or support) BS-controlled HO. On the other hand, in the event that the MS does not support BS-controlled HO, the BS may still decide to accept or allow the MS to enter or join its cell or network, e.g., if the BS is not currently using the BS-controlled HO feature, or if the BS has a light network load and adding a non-compliant MS will likely not create unacceptable network impact/delays.

For example, in response to receiving a message indicating that the MS does not support BS-controlled HO, the BS may reject the MS by the BS transmitting to the MS a rejection message, such as by sending a rejection message to the MS that rejects one or more network entry related requests from the MS. The BS may send a rejection message, such as, for example: a ranging response message indicating abort to the mobile station, which may cause the MS to abort ranging or network entry; a ranging response message indicating downlink frequency overwrite or preamble index overwrite instructing the MS to move to another BS; a registration response message rejecting a registration request from the MS; and an authentication response rejecting an authentication request from the MS, as some examples.

In addition, the BS may send a message to the MS 106 indicating whether or not the BS 104 supports BS-controlled HO, shown by way of example, as SBC-RSP message 616 in FIG. 6. Thus, during network entry, such as during a capabilities exchange with the BS, the MS may determine that the BS supports the BS-controlled HO feature. In response to this message, the MS 106 may determine whether or not the MS will continue with network entry with this BS, based at least in part on the indication from BS 104 of the BS's support for the BS-controlled HO feature, for example. Thus, if the BS supports this feature, but the MS does not, then the MS may decide to discontinue (or abandon) further network entry procedures with this BS 104, and may attempt network entry with another BS, e.g., that does not support this feature.

The tables shown below illustrate examples of the BS-controlled HO field, which may be used by a MS or BS to indicate support for this feature.

Extended Capability: BS-controlled HO

The extended capability field may specify the extended capability support for the specified features.

| Name | Type | Length | Value (variable-length) | Scope |
|---|---|---|---|---|
| Extended capability | 184 | 1 | Bit 0: This bit describes the capability to support ARQ Map Last Bit concept and the optimized Sequence Block as defined in Table 169. The feature is enabled only in case both MS and BS support it. Bit 1: This bit describes the capability to support BS-controlled HO. If an MS supports this capability it shall set this bit to 1 and this TLV shall be transmitted; if the MS does not support the BS-controlled HO capability it shall set to zero this bit in case this TLV is transmitted otherwise default value is "not support"; (same for BS—thus, this flag may be used by both MS and BS to indicate support or not for this feature). The feature is enabled only in case both MS and BS support it (in one example embodiment). Bits 1-2-7: Reserved, set to zero. | SBC-RSP, SBC-REQ |

Load Balancing Capability

The load balancing capability field indicates that the MS is capable of supporting load balancing (or BS-controlled HO) features. A bit value of 0 indicates "not supported" while 1 indicates "supported". This may be provided, e.g., for 1-way capabilities exchange from MS to BS.

| Name | Type | Length | Value (variable-length) | Scope |
|---|---|---|---|---|
| Load balancing capability | 87 | 1 | Bits 0: BS controlled HO capability<br>Bits 1-7: Reserved | SBC-REQ |

Figure 7:
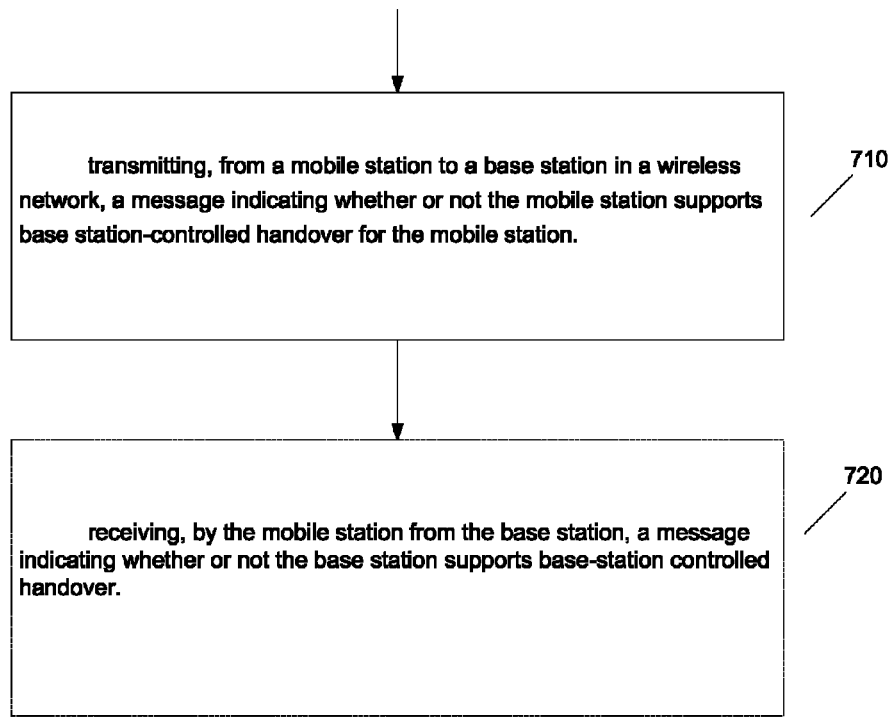
FIG. 7 is a flow chart illustrating operation of a mobile station according to an example embodiment.

FIG. 7 is a flow chart illustrating operation of a mobile station according to an example embodiment. Referring to FIG. 7, operation 710 may include transmitting, from a mobile station to a base station in a wireless network, a message indicating whether or not the mobile station supports base station-controlled handover for the mobile station.

In the flow chart of FIG. 7, the transmitting operation 710 may include transmitting, from the mobile station to the base station, a capability request message that includes a bit or flag that indicates whether or not the mobile station supports base-station controlled handover for the mobile station.

In the flow chart of FIG. 7, the transmitting operation 710 may include transmitting, from the mobile station to the base station, an IEEE 802.16 subscriber station basic capability (SBC) request message that includes a bit or flag that indicates whether or not the mobile station supports base-station controlled handover for the mobile station.

In an example embodiment, the flow chart of FIG. 7 may further include a receiving operation 720, including receiving, by the mobile station from the base station, a message indicating whether or not the base station supports base-station controlled handover.

In an example embodiment, the flow chart of FIG. 7 may further include receiving, by the mobile station from the base station, a message indicating that the base station supports base station-controlled handover; and determining, by the mobile station, whether the mobile station will continue with a network entry with the base station, based at least in part on the message indicating that the base station supports base station-controller handover.

In an example embodiment, the flow chart of FIG. 7 may further include receiving, by the mobile station from the base station, a message indicating that the base station supports base station-controlled handover; and discontinuing (or abandoning), by the mobile station, further network entry-related procedures with the base station, based at least in part on the message indicating that the base station supports base station-controller handover.

In an example embodiment, the flow chart of FIG. 7 may further include receiving, by the mobile station from the base station, a message indicating that the base station supports base station-controlled handover; determining, by the mobile station, that the mobile station does not support base station-controlled handover; and discontinuing (or abandoning), by the mobile station, further network entry-related procedures with the base station, based at least in part on base station-controller handover.

According to another example embodiment, an apparatus may include a controller; and a wireless transceiver. In an example embodiment, the apparatus (or the wireless transceiver under control of the controller) may be configured to transmit, from a mobile station to a base station in a wireless network, a message indicating whether or not the mobile station supports base station-controlled handover for the mobile station.

In an example embodiment, the apparatus may be configured to transmit comprises the apparatus being configured to transmit, from the mobile station to the base station, a capability request message that includes a bit or flag that indicates whether or not the mobile station supports base-station controlled handover for the mobile station.

In an example embodiment, the apparatus may be configured to transmit, from the mobile station to the base station, an IEEE 802.16 subscriber station basic capability (SBC) request message that includes a bit or flag that indicates whether or not the mobile station supports base-station controlled handover for the mobile station.

In an example embodiment, the apparatus may be further configured to receive, by the mobile station from the base station, a message indicating whether or not the base station supports base-station controlled handover.

Figure 8:
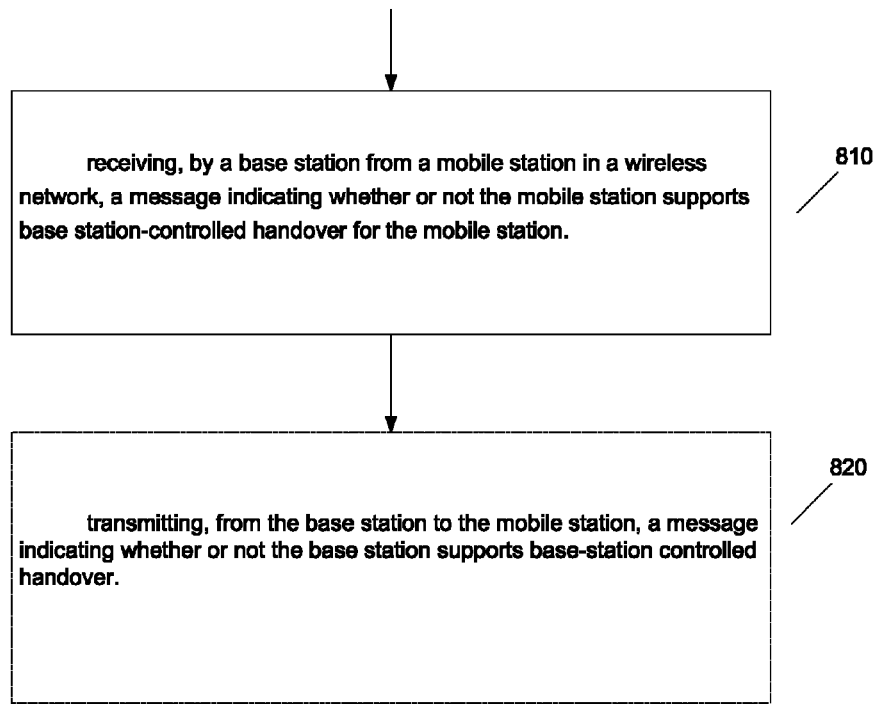
FIG. 8 is a flow chart illustrating operation of a base station (or other infrastructure node) according to an example embodiment.

FIG. 8 is a flow chart illustrating operation of a base station according to an example embodiment. The method may include receiving 810, by a base station from a mobile station in a wireless network, a message indicating whether or not the mobile station supports base station-controlled handover for the mobile station.

In the flow chart of FIG. 8, the receiving operation 810 may include receiving, by the base station from the mobile station in a wireless network, a capability request message that includes a bit or flag that indicates whether or not the mobile station supports base-station controlled handover for the mobile station.

In the flow chart of FIG. 8, the receiving operation 810 may include receiving, by the base station from the mobile station in a wireless network, an IEEE 802.16 subscriber station basic capability (SBC) request message that includes a bit or flag that indicates whether or not the mobile station supports base-station controlled handover for the mobile station.

In the flow chart of FIG. 8, the method may further include transmitting 820, from the base station to the mobile station, a message indicating whether or not the base station supports base-station controlled handover.

In the flow chart of FIG. 8, the method may further include transmitting, from the base station to the mobile station, an IEEE 802.16 subscriber station basic capability (SBC) response message that includes a bit or flag that indicates whether or not the base station supports base-station controlled handover for the mobile station.

In the flow chart of FIG. 8, the method may further include transmitting, from the base station, a message indicating that the base station-controlled handover is being used by the base station.

In the flow chart of FIG. 8, the method may further include broadcasting, from the base station, a downlink channel descriptor (DCD) that includes a flag indicating that the base station-controlled handover is being used by the base station.

In the flow chart of FIG. 8, the receiving operation 810 may include receiving, by a base station from the mobile station in a wireless network, a message indicating that the mobile station does not support base station-controlled handover for the mobile station; and, the method further including transmitting, from the base station to the mobile station based on the indication that the mobile station does not support base station-controlled handover, a rejection message rejecting one or more network entry-related requests from the mobile station. In an example embodiment, transmitting a rejection message may include transmitting at least one of the following to the mobile station: a ranging response message indicating abort to the mobile station; a registration response message rejecting a registration request from the mobile station; an authentication response message rejecting an authentication request from the mobile station, or other message.

In an example embodiment, the receiving operation 810 may include receiving, by a base station from the mobile station in a wireless network, a message indicating that the mobile station does not support base station-controlled handover for the mobile station. Also, the method illustrated in FIG. 8 may further include determining that a network load is greater than a threshold; and transmitting, from the base station to the mobile station, a rejection message rejecting one or more network entry-related requests from the mobile station, based on the receiving the message indicating that the mobile station does not support base station-controlled handover and that the network load is greater than a threshold.

According to another example embodiment, an apparatus may include a controller, and a wireless transceiver. The apparatus (e.g., the wireless transceiver under control of the controller) may be configured to receive, by a base station from a mobile station in a wireless network, a message indicating whether or not the mobile station supports base station-controlled handover for the mobile station.

In an example embodiment, the apparatus being configured to receive may include the apparatus being configured to receive, by the base station from the mobile station in a wireless network, a capability request message that includes a bit or flag that indicates whether or not the mobile station supports base-station controlled handover for the mobile station.

In an example embodiment, the apparatus being configured to receive may include the apparatus being configured to receive, by the base station from the mobile station in a wireless network, an IEEE 802.16 subscriber station basic capability (SBC) request message that includes a bit or flag that indicates whether or not the mobile station supports base-station controlled handover for the mobile station.

In an example embodiment, the apparatus may be further configured to transmit, from the base station to the mobile station, a message indicating whether or not the base station supports base-station controlled handover. This transmitting may include the apparatus being configured to transmit an IEEE 802.16 subscriber station basic capability (SBC) response message that includes a bit or flag that indicates whether or not the base station supports base-station controlled handover for the mobile station. For example, this may include the apparatus (e.g., at a BS) being configured to transmit a message indicating that the base station-controlled handover is being used by the base station.

In an example embodiment, the apparatus may be further configured to broadcast, from the base station, a downlink channel descriptor (DCD) that includes a flag indicating that the base station-controlled handover is being used by the base station.

In another example embodiment the apparatus being configured to receive may include the apparatus being configured to receive, by the base station from the mobile station in a wireless network, a message indicating that the mobile station does not support base station-controlled handover for the mobile station. Also, the apparatus may be further configured to transmit, from the base station to the mobile station, a rejection message rejecting one or more network entry-related requests from the base station, based on the indication that the mobile station does not support base station-controlled handover.

A number of additional example embodiments will now be described. A method may include indicating, from a mobile station to a base station in a wireless network, whether or not the mobile station supports base station-controlled handover for the mobile station. In an example embodiment, the indicating may include implicitly indicating from the mobile station to the base station, whether or not the mobile station supports base station-controlled handover, by not transmitting a capability request message that includes a bit or flag that indicates whether or not the mobile station supports base-station controlled handover for the mobile station.

In another example embodiment, a method may include indicating, from a base station to a mobile station in a wireless network, whether or not the base station supports base station-controlled handover for the mobile station. In an example embodiment, the indicating may include implicitly indicating from the base station to the mobile station, whether or not the base station supports base station-controlled handover, by not transmitting a capability request message that includes a bit or flag that indicates whether or not the base station supports base-station controlled handover for the mobile station.

In another example embodiment, a method may include determining, by a base station, that a mobile station does not support base station-controlled handover, based on a failure of the base station to receive an indication from the mobile station that the mobile station supports base station-controlled handover. The method may further include the base station transmitting to the mobile station a rejection message rejecting one or more network entry-related requests from the mobile station, in response to the determining.

According to another example embodiment, a method may include determining, by a mobile station, that a mobile station supports base station controlled-handover, based on a failure of the mobile station to receive an indication from the base station that the base station does not support base station-controlled handover. The method may further include the mobile station discontinuing further network entry-related procedures with the base station based on the determining.

Figure 9:
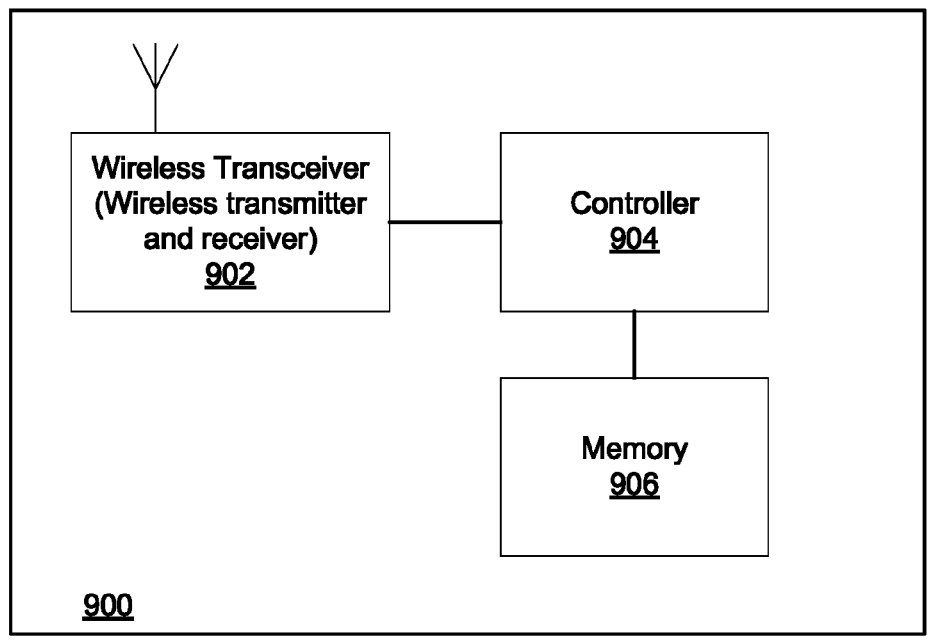
FIG. 9 is a block diagram of a wireless node according to an example embodiment.

FIG. 9 is a block diagram of a wireless station (or wireless node) 900 according to an example embodiment. The wireless station 900 (e.g., base station 104 or mobile station 106) may include, for example, a wireless transceiver (or wireless interface) 902, including a transmitter to transmit signals and a receiver to receive signals, a controller 904 to control operation of the station and execute instructions or software, and a memory 906 to store data and/or instructions. Controller 904 may also make decisions or determinations, generate frames or messages for transmission, decode received frames or messages for further processing, and other tasks or functions described herein. Controller 904 may be programmable and capable of executing software or other instructions stored in memory or on other computer media to perform the various tasks and functions described above, such as one or more of the tasks or methods described above.

In addition, a storage medium may be provided that includes stored instructions, which when executed by a controller or processor may result in the controller 904, or other controller or processor, performing one or more of the functions or tasks described above.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
transmitting, from a mobile station to a base station in a wireless network, a message indicating whether or not the mobile station supports base station-controlled handover for the mobile station.

2. The method of claim 1 wherein the transmitting comprises transmitting, from the mobile station to the base station, a capability request message that includes a bit or flag that indicates whether or not the mobile station supports base-station controlled handover for the mobile station.

3. The method of claim 1 wherein the transmitting comprises transmitting, from the mobile station to the base station, an IEEE 802.16 subscriber station basic capability (SBC) request message that includes a bit or flag that indicates whether or not the mobile station supports base-station controlled handover for the mobile station.

4. The method of claim 1 and further comprising receiving, by the mobile station from the base station, a message indicating whether or not the base station supports base-station controlled handover.

5. The method of claim 1 and further comprising:
receiving, by the mobile station from the base station, a message indicating whether or not the base station supports base station-controlled handover; and
determining, by the mobile station, whether the mobile station will continue with a network entry with the base station, based at least in part on the message indicating whether or not the base station supports base station-controller handover or on the absence of the message indicating whether or not the base station supports base station-controller handover.

6. The method of claim 1 and further comprising:
receiving, by the mobile station from the base station, a message indicating that the base station supports base station-controlled handover; and
determining, by the mobile station, whether the mobile station will continue with a network entry with the base station, based at least in part on the message indicating that the base station supports base station-controller handover.

7. The method of claim 1 and further comprising:
receiving, by the mobile station from the base station, a message indicating that the base station supports base station-controlled handover; and
discontinuing (or abandoning), by the mobile station, further network entry-related procedures with the base station, based at least in part on the message indicating that the base station supports base station-controller handover.

8. The method of claim 1 and further comprising:
receiving, by the mobile station from the base station, a message indicating whether or not the base station supports base station-controlled handover; and
discontinuing (or abandoning), by the mobile station, further network entry-related procedures with the base station, based at least in part on the message indicating whether or not the base station supports base station-controller handover or on the absence of the message indicating whether or not the base station supports base station-controller handover.

9. The method of claim 1 and further comprising:
receiving, by the mobile station from the base station, a message indicating whether or not the base station supports base station-controlled handover;
determining, by the mobile station, that the mobile station does not support base station-controlled handover; and
discontinuing (or abandoning), by the mobile station, further network entry-related procedures with the base station, based at least in part on base station-controller handover.

10. The method of claim 1 and further comprising:
receiving, by the mobile station from the base station, a message indicating that the base station supports base station-controlled handover;
determining, by the mobile station, that the mobile station does not support base station-controlled handover; and
discontinuing (or abandoning), by the mobile station, further network entry-related procedures with the base station, based at least in part on base station-controller handover.

11. A method comprising:
indicating, from a mobile station to a base station in a wireless network, whether or not the mobile station supports base station-controlled handover for the mobile station.

12. The method of claim 11 wherein the indicating comprises implicitly indicating from the mobile station to the base station, whether or not the mobile station supports base station-controlled handover, by not transmitting a capability request message that includes a bit or flag that indicates whether or not the mobile station supports base-station controlled handover for the mobile station.

13. A method comprising:
indicating, from a base station to a mobile station in a wireless network, whether or not the base station supports base station-controlled handover for the mobile station.

14. The method of claim 13 wherein the indicating comprises implicitly indicating from the base station to the mobile station, whether or not the base station supports base station-controlled handover, by not transmitting a capability request message that includes a bit or flag that indicates whether or not the base station supports base-station controlled handover for the mobile station.

15. An apparatus comprising:
a processor, and
a wireless transceiver;
the apparatus being configured to receive, by a base station from a mobile station in a wireless network, a message indicating whether or not the mobile station supports base station-controlled handover for the mobile station.

16. The apparatus of claim 15 wherein the apparatus being configured to receive comprises the apparatus being configured to receive, by the base station from the mobile station in a wireless network, a capability request message that includes a bit or flag that indicates whether or not the mobile station supports base-station controlled handover for the mobile station.

17. The apparatus of claim 15 wherein the apparatus being configured to receive comprises the apparatus being configured to receive, by the base station from the mobile station in a wireless network, an IEEE 802.16 subscriber station basic capability (SBC) request message that includes a bit or flag that indicates whether or not the mobile station supports base-station controlled handover for the mobile station.

18. The apparatus of claim 15 wherein the apparatus being further configured to transmit, from the base station to the mobile station, a message indicating whether or not the base station supports base-station controlled handover.

19. The apparatus of claim 15 wherein the apparatus being further configured to transmit, from the base station to the mobile station, an IEEE 802.16 subscriber station basic capability (SBC) response message that includes a bit or flag that indicates whether or not the base station supports base-station controlled handover for the mobile station.

20. The apparatus of claim 15 wherein the apparatus being further configured to transmit, from the base station, a message indicating that the base station-controlled handover is being used by the base station.

21. The apparatus of claim 15 wherein the apparatus being further configured to broadcast, from the base station, a downlink channel descriptor (DCD) that includes a flag indicating that the base station-controlled handover is being used by the base station.

22. The method of claim 15 wherein the apparatus being configured to receive comprises the apparatus being configured to receive, by the base station from the mobile station in a wireless network, a message indicating that the mobile station does not support base station-controlled handover for the mobile station;
the apparatus being further configured to transmit, from the base station to the mobile station, a rejection message rejecting one or more network entry-related requests from the base station, based on the indication that the mobile station does not support base station-controlled handover.

* * * * *

UNITED STATES PATENT AND TRADEMARK OFFICE
CERTIFICATE OF CORRECTION

| | | |
|---|---|---|
| PATENT NO. | : 8,630,262 B2 | Page 1 of 1 |
| APPLICATION NO. | : 13/059380 | |
| DATED | : January 14, 2014 | |
| INVENTOR(S) | : Aik Chindapol et al. | |

It is certified that error appears in the above-identified patent and that said Letters Patent is hereby corrected as shown below:

In the Claims

In column 16, line 20, in claim 22, delete "method" and insert -- apparatus --, therefor.

Signed and Sealed this
Nineteenth Day of August, 2014

Michelle K. Lee
*Deputy Director of the United States Patent and Trademark Office*